L. BAUMGARTL.
AUTOMOBILE BUMPER.
APPLICATION FILED MAR. 7, 1921.

1,381,614.

Patented June 14, 1921.
2 SHEETS—SHEET 1.

Inventor,
Leroy Baumgartl
By

L. BAUMGARTL.
AUTOMOBILE BUMPER.
APPLICATION FILED MAR. 7, 1921.

1,381,614.

Patented June 14, 1921.
2 SHEETS—SHEET 2.

Inventor
Leroy Baumgartl
By

UNITED STATES PATENT OFFICE.

LEROY BAUMGARTL, OF CHICAGO, ILLINOIS.

AUTOMOBILE-BUMPER.

1,381,614.  Specification of Letters Patent.   Patented June 14, 1921.

Application filed March 7, 1921. Serial No. 450,271.

*To all whom it may concern:*

Be it known that I, LEROY BAUMGARTL, a citizen of the United States, and a resident of Chicago, in the county of Cook and State of Illinois, have invented certain new and useful Improvements in Automobile-Bumpers, of which the following is a specification.

This invention relates to improvements in automobile bumpers, and similar devices for protecting a motor vehicle against damage in the event of collisions with other vehicles or obstacles.

The type of bumper to which the present invention pertains is similar to that disclosed in U. S. Letters Patent No. 1,346,478, granted to me on July 13, 1920.

Among the objects of the present invention is to provide for certain refinements and improved features of construction directed especially to the structural arrangement of the parts, with a view to increasing the ability of the structure to withstand the wear and tear to which devices of this character are subjected. In short, it is proposed to provide a more practical bumper embodying the principles set forth in the above mentioned patent. A preferred disclosure of a bumper embodying the invention is set forth in the accompanying drawings, in which—

Figure 1:
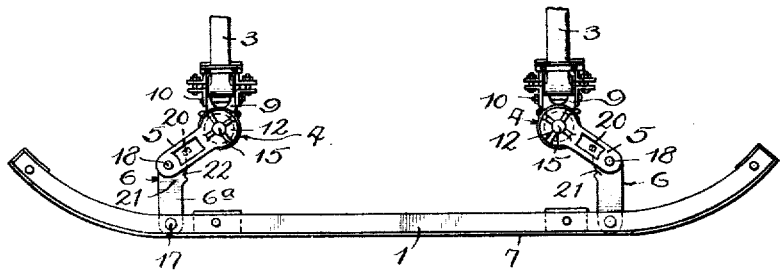
Figure 1 is a top plan view of the bumper as attached to a motor vehicle.
Figure 2:
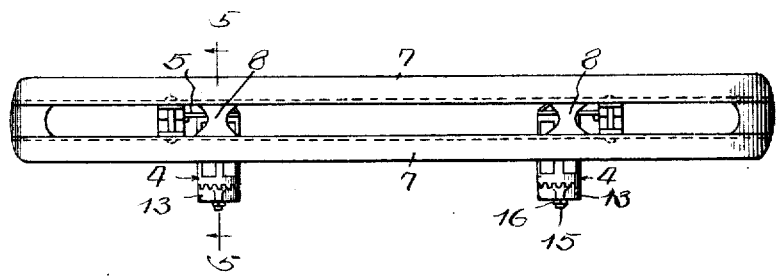
Fig. 2 is a similar view in front elevation.

Referring to the general features of the bumper, the same comprises an impact member 1 extending horizontally in front of the vehicle, supporting members each attached at the forward ends of the frame members 3—3 of the vehicle, each of the supporting members comprising a vertically disposed cylinder or casing 4, located immediately beyond the adjacent frame member 3, and comprising, among other parts, an arm 5 extending radially and in a forward and lateral direction toward the impact member 1. As will hereinafter be pointed out, the arm 5 of each supporting member is adapted to be swung or rotated about the vertical axis of the cylinder 4, and in a direction toward the vehicle, the swinging or rotative movement of the arm being resisted by a yieldable member hereinafter to be described. The outer ends of the arms 5—5 are connected to the impact member by means of links 6—6 arranged in parallel relation to each other, and normally at right angles to the said impact member.

Referring first to the structure of the impact member, the same preferably comprises two parallel bars 7—7 spaced apart vertically, and having the form of angle bars connected together at their ends, and at suitable points intermediate their ends by means of spacer blocks 8. The formation of the separate bars 7—7 is such as to provide a relatively non-resilient or non-flexible impact receiving member. The ends of the impact member 1 are preferably curved rearwardly, as is common in automobile bumpers.

Figure 3:
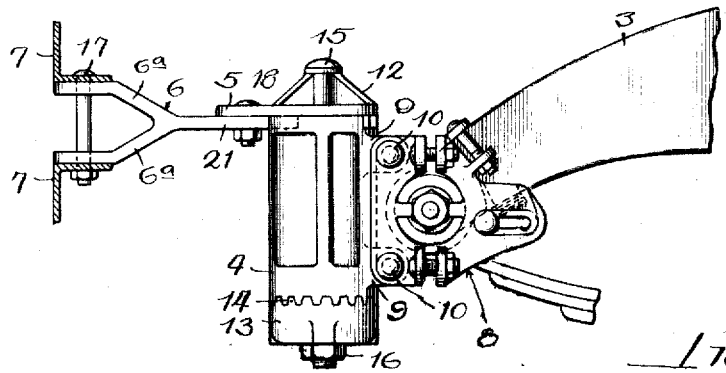
Fig. 3 is an enlarged view of a single cylinder, showing the connection between the same and the impact member.
Figure 5:
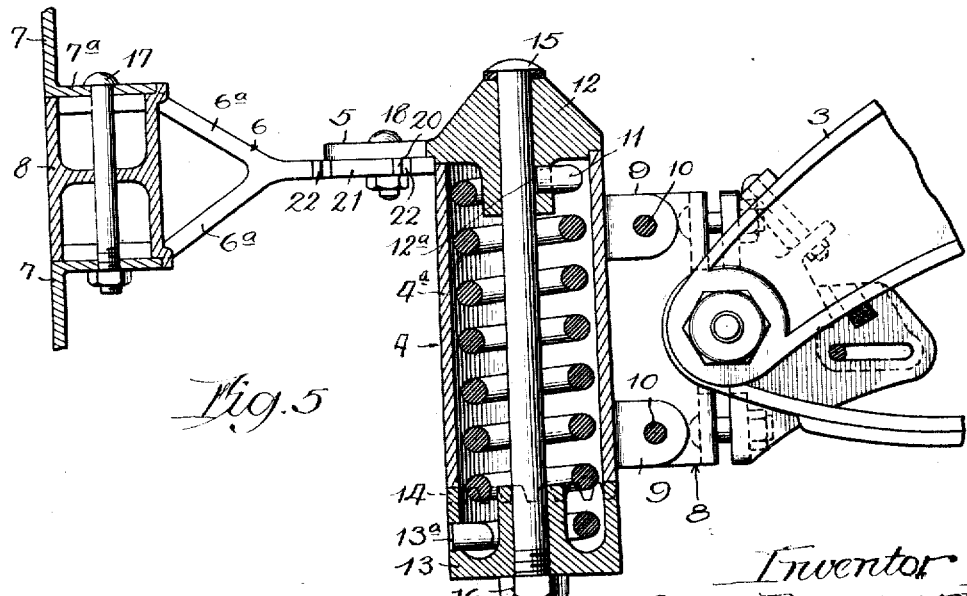
Fig. 5 is a view in vertical section of the cylinder taken on line 5—5 of Fig. 4.

As before suggested, the supporting members comprise the casing 4 and the arms 5. Referring now to a more detailed description of the structure of each of the supporting members, the main supporting element thereof is a vertically disposed cylindrical housing 4ª of cast metal construction, located immediately forward of the frame member 3, and fixed thereto by means of a bracket 8 consisting of an arrangement of plates adapted to be clamped or bolted to the frame member, these plates in turn being bolted to the housing 4ª through the medium of ears 9 integral with the housing, and bolts 10—10 passing through said ears and the forward pair of plates of the bracket 8. As clearly shown in Fig. 5, the housing 4ª is hollow and incloses a yieldable impact resisting member having the form of a comparatively stiff helical spring 11. The top of the housing 4ª is surmounted by a rotative cap 12, of which the radial arm 5 hereinbefore referred to, is an integral part. The lower end of the housing 4ª is closed in a similar manner by means of a cap member 13, although the latter is normally non-rotative with respect to the casing 4, the non-rotative connection between the parts being provided for by an arrangement of interlocking teeth along the abutting edges of the housing and the lower cap member 13, as shown at 14 in Figs. 3 and 5. Extending axially of the casing, and through the upper and lower cap members 12 and 13 respectively, is a bolt or spindle 15 acting to connect said cap members to the housing, as well as forming a bearing for the upper cap member 12. The lower end of the bolt 15 projects from the casing, and is surmounted by a nut 16, the same permitting the removal of the bolt 15 for the purpose of disassembling the casing or adjusting the tension in the spring 11, as will hereinafter be pointed out. The upper end of the spring 11 is fixed to the rotative cap member 12, preferably by inserting its end within an opening formed within a depending boss 12ª at the base of said cap member. In a similar manner, the lower end of the spring 11 is fixed to the lower cap member 13; namely, by inserting the lower extremity of the spring within a recess 13ª formed in the outer wall of said cap member 13.

As before indicated, the outer or free ends of the arms 5—5 are connected to the impact member through the medium of the links 6—6, each of these links 6 consisting of a bar having pivotal connection at its ends with the members connected thereby. As a preferable construction, and by reason of the structure of the impact member 1, the outer portion of each link 6 is forked or bifurcated, thus forming two vertically spaced arms 6ª—6ª, which extend between the bars 7—7 of the impact member 1, and engage flatwise against the rearwardly projecting horizontal webs 7ª—7ª thereof, as clearly shown in Fig. 3. A bolt 17 extends through the webs 7ª—7ª and the extremities of the forked portion 6ª—6ª of the link 6, and serves to pivotally connect the parts together. Each link 6 is pivotally connected with the outer end of its associated arm 5 by means of a short pivot bolt 18. It is obvious that by an arrangement of parts such as described, the bumper, and parts thereof, assumes the normal position as shown in Fig. 1; namely, with the arms 5—5 of the supporting members extending laterally and outwardly in opposite directions toward the adjacent ends of the impact member, and obliquely to the general direction in which a blow would ordinarily be directed against the impact member. In normal position of the bumper, the links 6—6 are substantially parallel to each other, and at right angles to the impact member. If a blow is received by the impact member, the force of the impact is transmitted to the links 6—6, and thence to the arms 5—5, with the result that the latter are swung or rotated in a rearward direction about the bolt or spindle 15, the amount of swinging movement of each arm being proportional to the distribution of the force of impact between the two supporting members, as determined by the relative distance of the point of impact from the points of support of the impact member. The swinging movement of the arms 5—5 obviously includes the rotation of the cap member 12 about the spindle 15, and by virtue of its connection with the spring 11, the latter yieldingly opposes or resists the rotative movement, with the result that the force of the impact will ultimately be overcome by the tension of the spring resisting the torsional strain transmitted thereto in the rotative movement of the arm 5 and the cap member 12. The resistive action of the spring has already been suggested; namely, a torsional resistance as distinguished from a compressive or expansive resistance.

Figure 4:
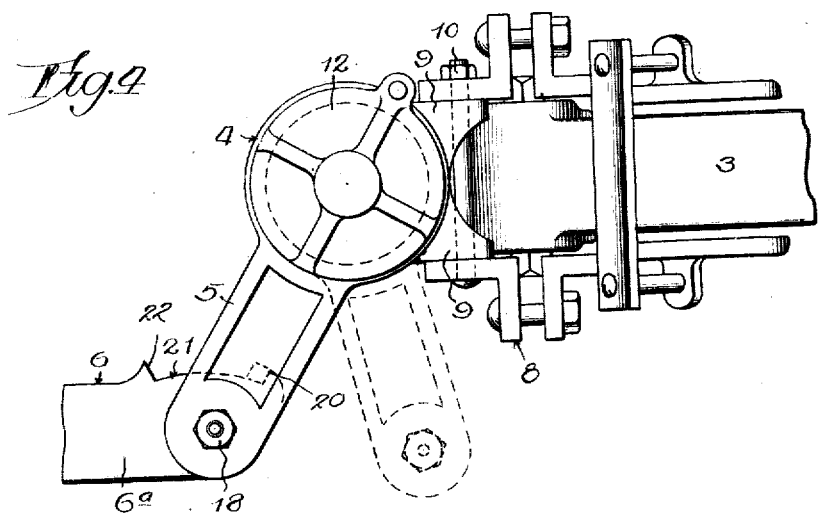
Fig. 4 is an enlarged top plan view of a single cylinder showing the parts in different positions.

In order to limit the relative rotative movement between the links 6—6 and the arms 5—5, there is provided on the under side of the arm 5 and at a point removed inwardly from the outer end thereof, a lug or stop member 20 (Fig. 4). Coöperating with this lug there is formed a curvilinear sector 21 along the adjacent end portion of the link 6, together with stop shoulders 22—22 at opposite ends of said sector 21. The length of the sector 21, and therefore the spacing of the stop shoulders 22—22, is predetermined by the amount of swinging movement of the arm 5 from normal position to its position of maximum displacement under impact. Thus, as shown in Fig. 4, the lug 20 engages the stop shoulder 22 of the link 6, adjacent the extremity thereof, when the parts are in normal position, as shown in full lines, and when the arm has been swung to the dotted line position under the force of impact, the lug 20 engages the opposite stop shoulder 22, thus preventing further movement between the arm 5 and its associated link 6. The presence of the stop shoulders and lug provides a somewhat more rigid construction, as well as limits the angle that the arm 5 and link 6 may be flexed in the displacement of the parts under the force of an impact delivered against the impact member 1.

It is further manifest that the capacity of the spring to resist or absorb the force of impact transmitted thereto is dependent not only upon the size of the spring, but likewise upon the initial tension at which the spring is set. In other words, the greater the initial tension, the greater the amount of force that may be resisted by the spring in a given displacement or swinging movement of the arm 5. In order that provision may be made for varying the initial tension in the spring 11, the cap member 13, to which the lower extremity of the spring is anchored, is capable of rotative adjustment with respect to the casing, as heretofore pointed out. By removing the nut 16 at the lower end of the spindle 15, it is possible to disconnect the parts and to disengage the interlocking teeth sufficiently to rotate the lower cap 13 in either direction, depending on whether or not more or less initial tension is required in the spring. The adjustment having been made, and the parts locked together again, the nut 16 is replaced and the spring is again in operative condition.

As has been heretofore pointed out, the basic principle of operation disclosed in the patent before mentioned, has not been departed from, although several improved features have been added thereto, which are believed to provide a more practical device, and one that is better fitted to fulfil the demands made upon a protective impact resisting structure. These features have been pointed out in detail, as well as the advantages thereof, and it is to these improved features that the appended claims are directed.

What I claim is:—

1. In a bumper, the combination of an impact member, and supporting members therefor adapted for attachment to the frame of a vehicle, and comprising arms adapted to swing about one end thereof, links connecting the free ends of said arms with said impact member, and yieldable members operatively connected with said arms and acting to resist the swinging movement of said arms under the force of impact against said impact member.

2. In a bumper, the combination of an impact member, supporting members adapted for attachment to the frame of a vehicle, each of said supporting members comprising a radially swinging arm, a link connecting the free end of said arm with the impact member, and a spring connected with said arm and acting to yieldingly resist the swinging movement of said arm under the force of impact against said impact member.

3. In a bumper, the combination of an impact member, supporting members adapted for attachment to the frame of a vehicle, and comprising an arm rotative about a vertical axis, a link connecting said arm with the impact member adjacent the end thereof, and a spring connected with said arm and acting to oppose the rotation thereof under the force of impact against the impact member.

4. A bumper comprising an impact member, a supporting member adapted for attachment to the frame of a vehicle, and comprising a housing, an arm extending radially from said housing and rotative about the axis thereof, a link connecting the arm with said impact member, a spring mounted in said housing and connected with said arm and said housing, and means for adjusting the tension of said spring.

5. A bumper comprising an impact member, a supporting member adapted for attachment to the frame of a vehicle, and comprising a vertically disposed casing, a rotative cap member mounted at one end of said casing having an integral arm projecting radially from said cap member, and having pivotal connection with said impact member, a helical spring mounted in said casing, and connected at one end with said casing, a normally non-rotative cap member mounted at the opposite end of said casing, and connected with the adjacent end of said spring, and means for rotatively adjusting said last mentioned cap member relative to said casing.

6. A bumper comprising an impact member, a supporting member adapted for attachment to a vehicle frame and comprising a housing, a spindle extending axially of said housing, an arm journaled on said spindle, and pivotally connected with said impact member, a spring mounted in said housing and fixed at one end to said arm, a normally non-rotative member mounted on said spindle and engaging said housing through the medium of interlocking teeth, said last mentioned member having fixed connection with the opposite end of said spring, and adapted for rotative adjustment relative to said housing.

7. A bumper comprising an impact member, a supporting member adapted for attachment to a vehicle frame and comprising a housing, a spindle extending axially of said housing, a rotative cap member journaled at one end of said housing and on said spindle, and having a radially extending arm pivotally connected with said impact member, a cap member journaled on said spindle and engaging the opposite ends of said casing by means of a series of interlocking teeth, a spring mounted in said housing and fixed at its ends to said cap member, the latter being adapted for rotative adjustment.

8. In a bumper, the combination of an impact member, a supporting member adapted for attachment to the frame of a vehicle comprising an arm adapted to swing relative to said supporting member, yielding means resisting the swinging movement of said arm, a link pivotally connected at one end with said arm, and at its opposite end with said impact member, and means for limiting the relative movement of said arm and link.

9. In a bumper, the combination of an impact member, supporting members adapted for attachment to the frame of a vehicle, each comprising an arm, a link pivotally connected with said arm and with said impact member, a spring acting to resist the swinging movement of said arm, and means for limiting the relative movement of said arm and link comprising co-acting stop members carried by said arm and link.

10. In a bumper, the combination of an impact member, supporting members adapted for attachment to the frame of a vehicle, each comprising an arm, a link pivotally connected with said arm and with said impact member, means for yieldably resisting the swinging movement of said arm, and means for limiting the relative movement of said arm and link comprising a lug carried by said arm and co-acting stop shoulders carried by said link.

In witness whereof, I hereunto subscribe my name this 1st day of March, A. D. 1921.

LEROY BAUMGARTL.